United States Patent [19]
DeMasters

[11] Patent Number: 5,639,184
[45] Date of Patent: Jun. 17, 1997

[54] IN-GROUND CONDUIT SYSTEM FOR GEOTHERMAL APPLICATIONS

[75] Inventor: Jimmie G. DeMasters, Wylie, Tex.

[73] Assignee: Phillips Petroleum Company, Bartlesville, Okla.

[21] Appl. No.: 611,296

[22] Filed: Mar. 5, 1996

Related U.S. Application Data

[62] Division of Ser. No. 336,447, Nov. 9, 1994, Pat. No. 5,533,356.
[51] Int. Cl.⁶ .................................................... E02D 5/74
[52] U.S. Cl. ............................................ 405/156; 405/244
[58] Field of Search ..................... 62/260; 165/45; 166/243; 248/231.9, 545, 925; 405/154, 156, 244

[56] References Cited

U.S. PATENT DOCUMENTS

| 2,554,661 | 5/1951 | Clancy | 165/45 |
| 4,538,673 | 9/1985 | Partin et al. | 165/45 |

*Primary Examiner*—William E. Tapolcai
*Attorney, Agent, or Firm*—Ryan N. Cross

[57] ABSTRACT

An in-ground conduit system for a ground source heat pump is provided. The in-ground conduit system is a conduit-loop having at least one wing member mounted on the conduit loop such that the wing member contacts the ground in such a way so as to resist upward movement of the conduit loop.

1 Claim, 6 Drawing Sheets

IN-GROUND CONDUIT SYSTEM FOR GEOTHERMAL APPLICATIONS

This application is a division of application Ser. No. 08/336,447, filed Nov. 9, 1994, now U.S. Pat. No. 5,533,356.

BACKGROUND OF THE INVENTION

The invention relates generally to the field of geothermal heating and air conditioning systems and in particularly to pipe systems used for in-ground heat exchange. The invention provides a system having in-ground conduit system which is simpler to install than previous conduit systems.

Geothermal heating and air conditioning systems, i.e. heat pump systems, are increasingly popular for efficient heating and cooling of loads, for example as part of a heating-ventilation-air conditioning (HVAC) system for buildings. Heat pump systems generally include heat exchangers thermally coupled to the load and to a heat source or heat sink, the heat exchangers being connected in a refrigerant or coolant loop which includes a compressor and an expander. The compressor raises the pressure (and therefore the temperature) of the refrigerant and the expander lowers the pressure, producing a lower temperature in the refrigerant.

In heating a load, a "ground source" heat pump, which has the source/sink heat exchanger thermally conductively coupled to the ground, can extract a virtually limitless supply of thermal energy from the earth and transfer the energy to the load. A heat pump cools a load by extracting thermal energy from the load and transferring it to the earth for dissipation therein. In this manner the ground functions as either a heat sink or heat source. Modern day heat pumps for HVAC systems are equipped with reversing features such as valves to arrange the flow of refrigerant so that they may both heat and cool the load, as needed.

A ground source heat pump requires a subterranean heat exchanger. While it is possible to use intermediate heat exchangers for transferring heat through thermally coupled fluid flow paths or the like, preferably the refrigerant or coolant is pumped through the pipes by the compressor and serves directly as the carrier for conveying the thermal energy to or from the ground. Thus, extra heat transfer losses, such as those inherent in ground water source systems, are avoided. The coolant is relatively heated by compression and cooled by expansion, leading to the respective heat exchangers, thereby raising the temperature of the hot side heat exchanger above the temperature of the load and lowering the temperature of the cool side heat exchanger below the temperature of the source, whereupon heat transfer occurs. Compression and expansion normally include a change of state of the coolant between liquid and gaseous states.

The load heat exchanger is typically above ground and the ground heat exchanger is preferably well below the surface of the ground. Connecting pipes for the ground heat exchanger, and the pipes defined by the heat exchanger itself, can be horizontal, vertical or slanted. A typical installation may include combinations of these orientations, depending upon particular design criteria. The problem encountered in the installation of the pipes, particularly in a vertical or slanted orientation, is the tendency of the pipe to rise upward in the vertical or slanted hole after installation.

Generally, in installation of the slanted or vertical pipe, a bore-hole is drilled and a double run of pipe connected by a U-bend fitting is inserted into the bore-hole. The pipe is usually inserted into the bore-hole by utilizing weights attached to the U-bend fitting to force the pipe into the hole. After the pipe is inserted, the weights are usually retrieved using a line attached to the weights. However, when the steel bars used for weights to force the piping into the well are retrieved, the piping has a tendency to come out of the well with the weights.

It would be advantageous to have a low cost method of resolving the foregoing problem.

SUMMARY OF THE INVENTION

It is an object of this invention to provide an in-ground conduit system which can have a vertical or slanted orientation and avoid the problem of the conduit system moving upward in the vertical or slanted hole.

In accordance with the present invention, them is provided an in-ground conduit system for a ground source heat pump comprising at least one conduit loop having two substantially parallel members connected by a U-shaped pipe member having a vertex and further comprising at least one wing member mounted on the conduit loop at or near the vertex such that the wing member contacts the ground in such a way as to resist upward movement of the conduit loop.

In accordance with another aspect of the present invention, there is provided a method of preventing a pipe conduit loop from moving upward in a bore-hole. This is achieved by attaching at least one wing member to the pipe such that the wing member extends out from the pipe such that in lowering the pipe into the bore-hole the wing member points generally upward so that the wing member will allow the pipe to be lowered into the bore-hole but will contact the ground so as to resist upward movement of the pipe.

DESCRIPTION OF THE PREFERRED EMBODIMENTS

Figure 1:
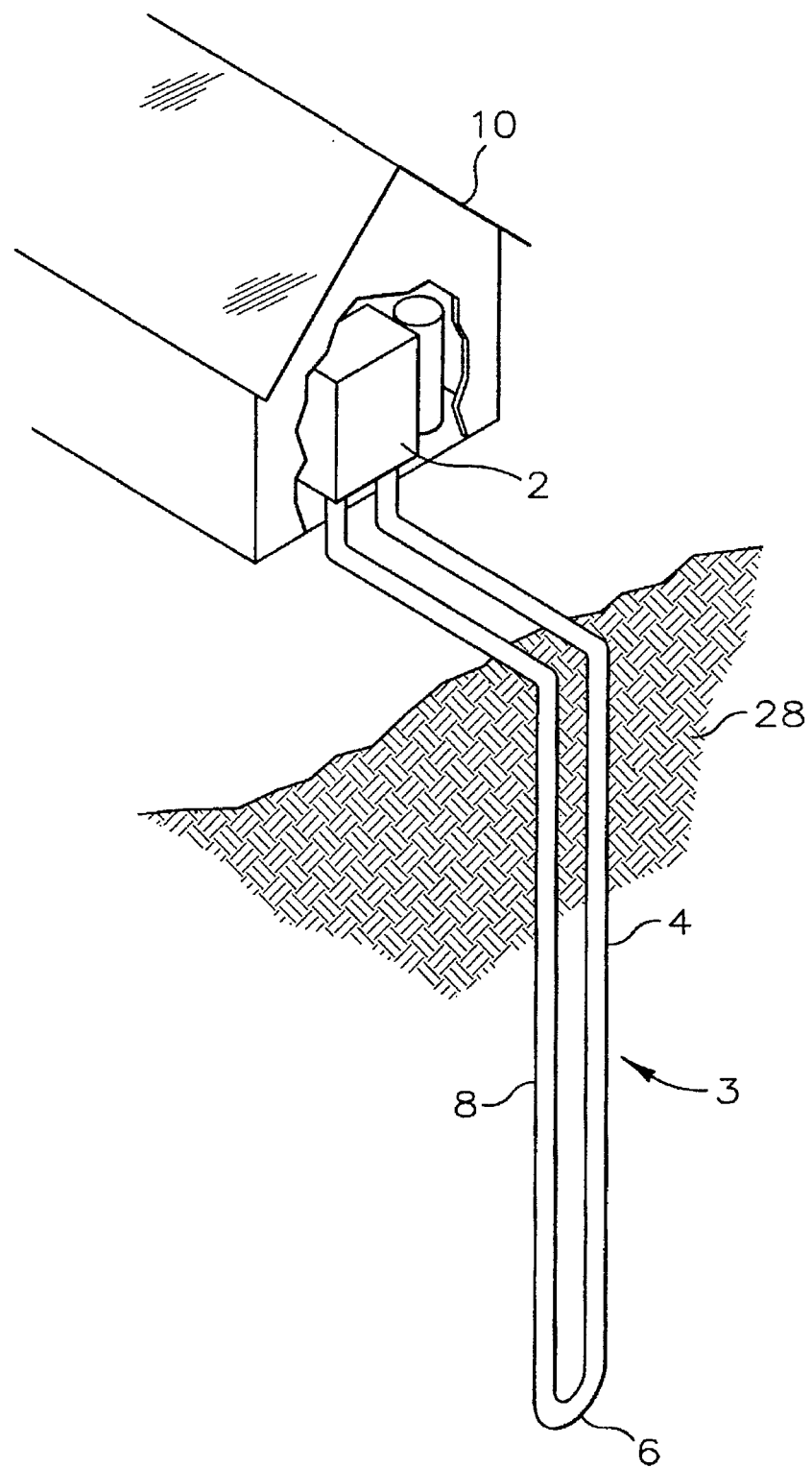
FIG. 1 is a simplified illustration of a geothermal heat pump system utilizing a vertical in-ground conduit system.

With continuing attention to the drawings wherein applied reference numerals indicate parts similarly hereinafter identified, FIG. 1 illustrates a geothermal heat pump system utilizing a vertical in-ground conduit system. Heat exchange fluid circulating through heat pump 2 moves through underground pipe 4, circulates through U-shaped pipe 6, moves up through underground pipe 8 and returns to heat pump 2. Underground pipes 4 and 8, along with U-shaped pipe 6, form in-ground conduit system 3. Typically underground pipes 4 and 8 will be straight, substantially parallel to each other and have a vertical or slanted orientation, preferably a vertical orientation. During the heating cycle, the heat transfer fluid absorbs heat from the earth 28 during its circulation through the in-ground conduit system 3 and returns to the heat pump where the heat pump compresses the warm heat transfer fluid to a higher temperature, extracts the heat from it, and distributes the heat extracted through conventional duct systems in the building 10.

During the cooling cycle, heat transfer fluid circulating through in-ground conduit system 3 ejects heat which is absorbed by the earth 28. The cooled heat transfer fluid then returns to the heat pump to pick up more heat removed from the building 10. FIG. 1 illustrates an example of a geothermal heat pump system using a single vertical ground loop for simplicity. However, most systems use more than one vertical loop, usually one loop for each ton of air conditioning capacity is used. The multiple loops are fused in parallel to a header pipe cam ting the heat transfer fluid to and from the building. Alternately, systems can be arranged to use a slanted in-ground conduit system rather than a vertical in-ground conduit system.

With both the vertical and slanted in-ground conduit system difficulties arise installing the pipe because of the tendency of the pipe to move upward. Typically, this problem is encountered during installation when the weights, which were used to place the in-ground conduit system into the drilled hole, are taken out of the hole. At that time, the pipe has a tendency to move upward with the weights as they are being removed.

Figure 2:
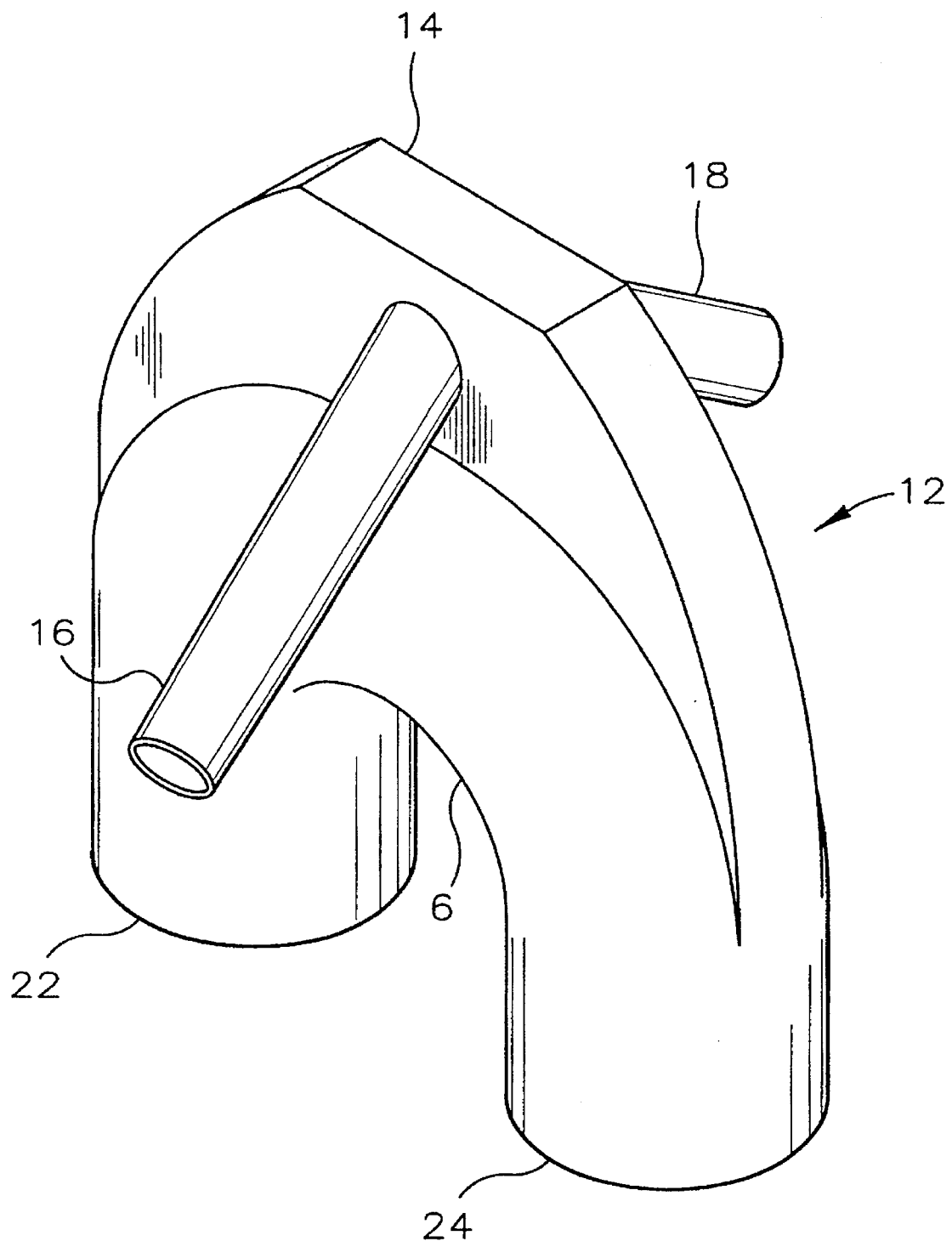
FIG. 2 is an isometric illustration of a U-bend fitting for an in-ground conduit system having two wing members.
Figure 3:
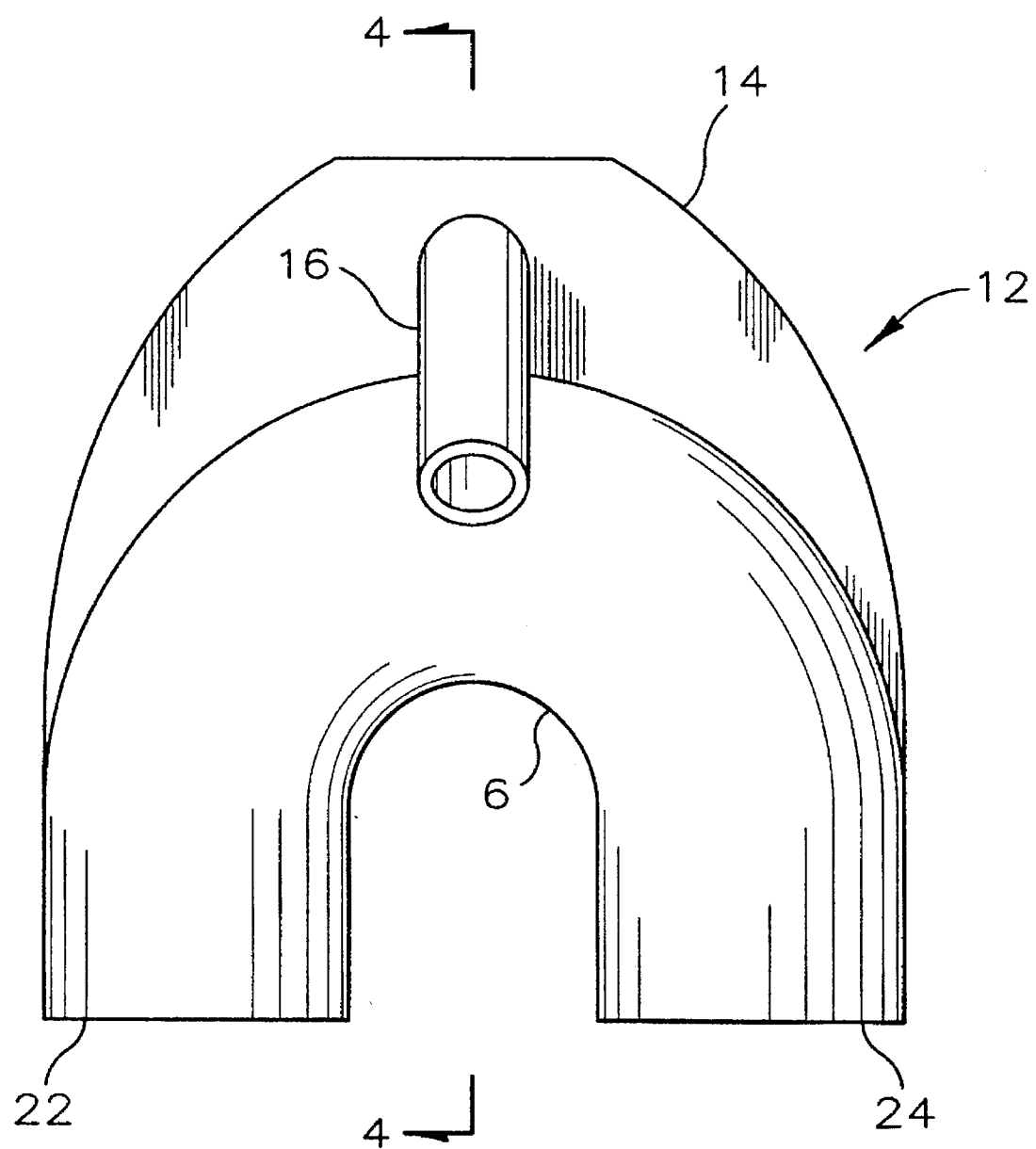
FIG. 3 is an elevation view of the embodiment illustrated in FIG. 2.
Figure 4:
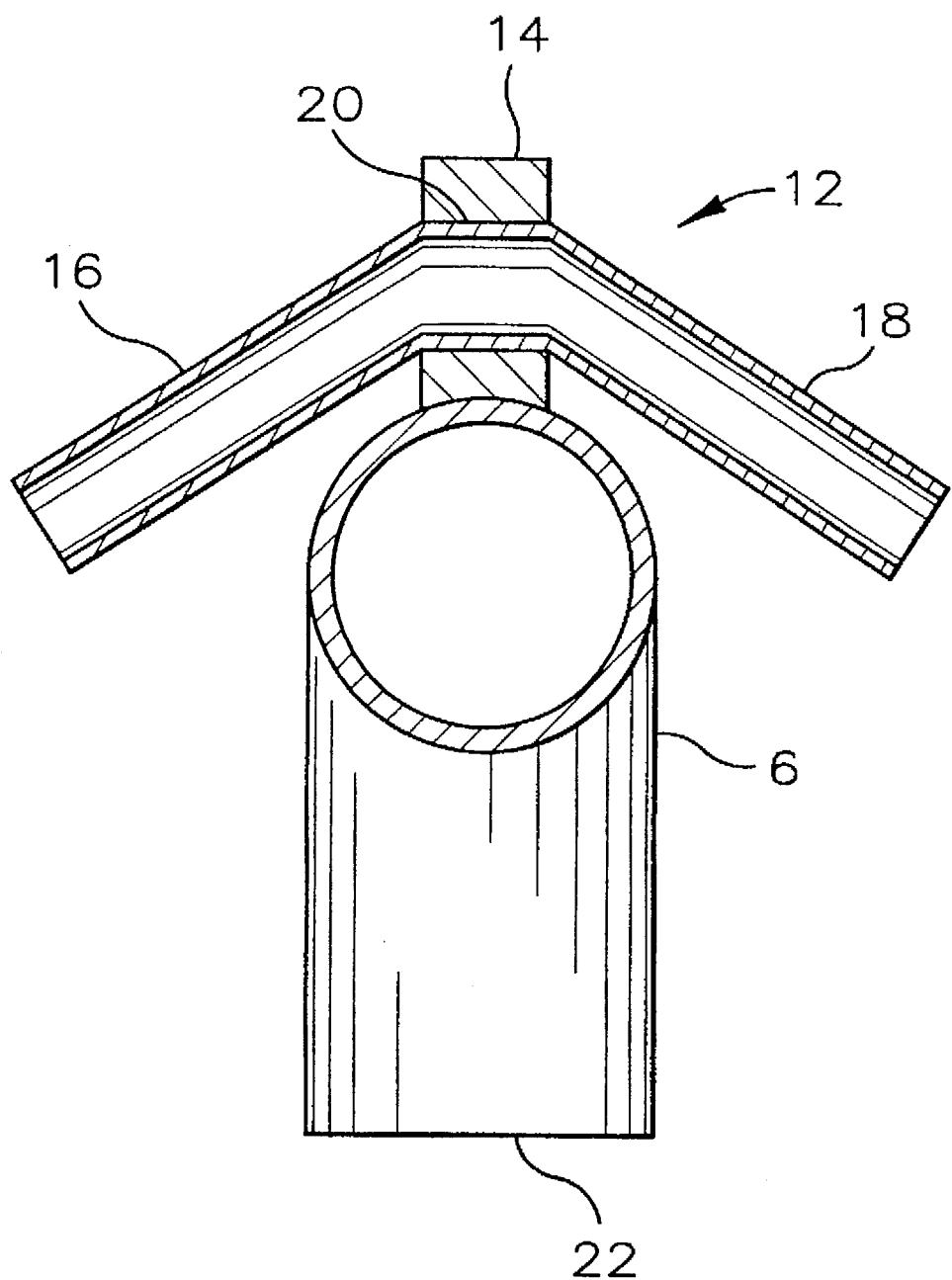
FIG. 4 is a section taken along line 4—4 of the embodiment of FIG. 3.

The present invention solves this problem by utilizing wing members attached to the in-ground conduit system of slanted or vertical pipes. Turning now to FIGS. 2–5, an embodiment of the present invention utilizing a pair wing members in accordance with the invention can be seen. In FIGS. 2–4, U-bend fitting 12 can be seen. U-bend fitting 12 comprises U-shaped pipe 6, mounting bracket 14 and wing members 16 and 18.

Mounting bracket 14 has a hole 20 (FIG. 4). The bracket 14 is positioned on U-shaped pipe 6 such that the hole is in the area of the vertex of the U-shaped pipe 6. Mounting bracket 14 can be attached to the U-shaped pipe 6 after it has been molded or, preferably, mounting bracket 14 is molded as an integral part of the U-shaped pipe 6.

Wing members 16 and 18 are formed from a single length of material such as a suitable relatively small diameter plastic pipe. Although wing members 16 and 18 can be formed from any suitable material and can be separate pieces attached at hole 20, they are illustrated as being formed from a single length of material, shown as a tube. While the material forming wing members 16 and 18 can be any suitable material which is resilient enough to allow the in-ground conduit system to be lowered into a well hole and yet strong enough to prevent upward movement of the conduit system, as described below, it is presently preferred to use polyethylene as the material. The length of material is inserted into hole 20 provided in mounting bracket 14. After the length of the material is centered within the hole the length of material is bent until it crimps on both sides of the U-bend. This locks the material into mounting bracket 14.

Figure 5:
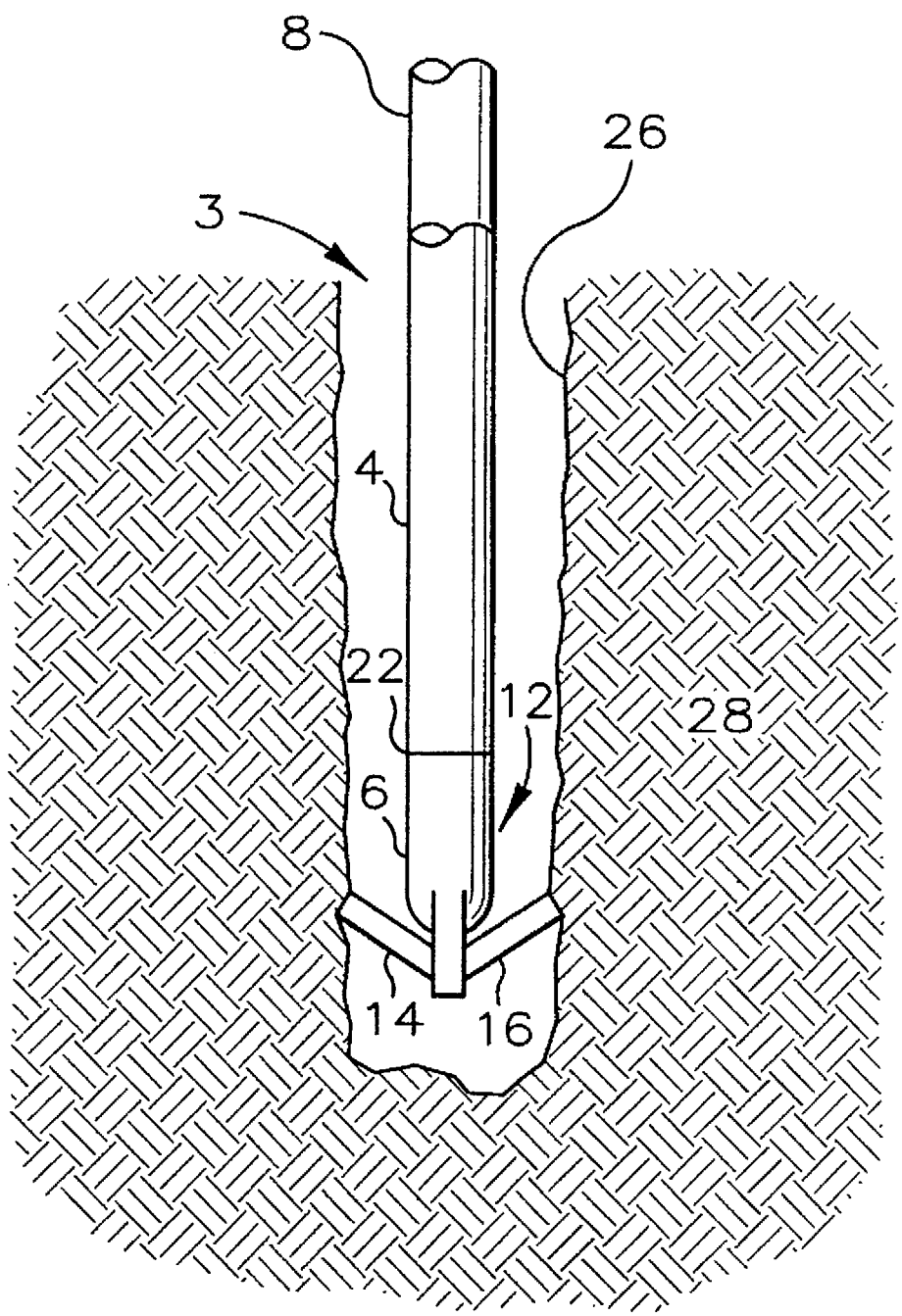
FIG. 5 is an illustration of the use of the embodiment of FIGS. 2–4.

Referring now to FIG. 5, U-bend fitting 12 is attached to underground pipe 4 at end 22 of U-shaped pipe 6. Similarly, end 24 of U-shaped pipe 6 is connected to underground pipe 8. The U-shaped pipe 6 is connected to underground pipes 4 and 8 so as to allow fluid flow communication such that the underground pipes along with the U-shaped pipe 6 accommodate a continuous loop for the fluid flow.

Wing members 16 and 14 are positioned so that they point outward and upward from in-ground conduit system 3. Thus, when the pipe is being lowered into hole 26, the wing members will flex upwards to allow in-ground conduit system 3 to enter the hole and be lowered therein. However, when upward pressure is applied, wing members 14 and 16 will catch on the sides of the bore-hole coming into contact with the ground 28 and thus resisting the in-ground conduit system 3 from moving upward.

Figure 6:
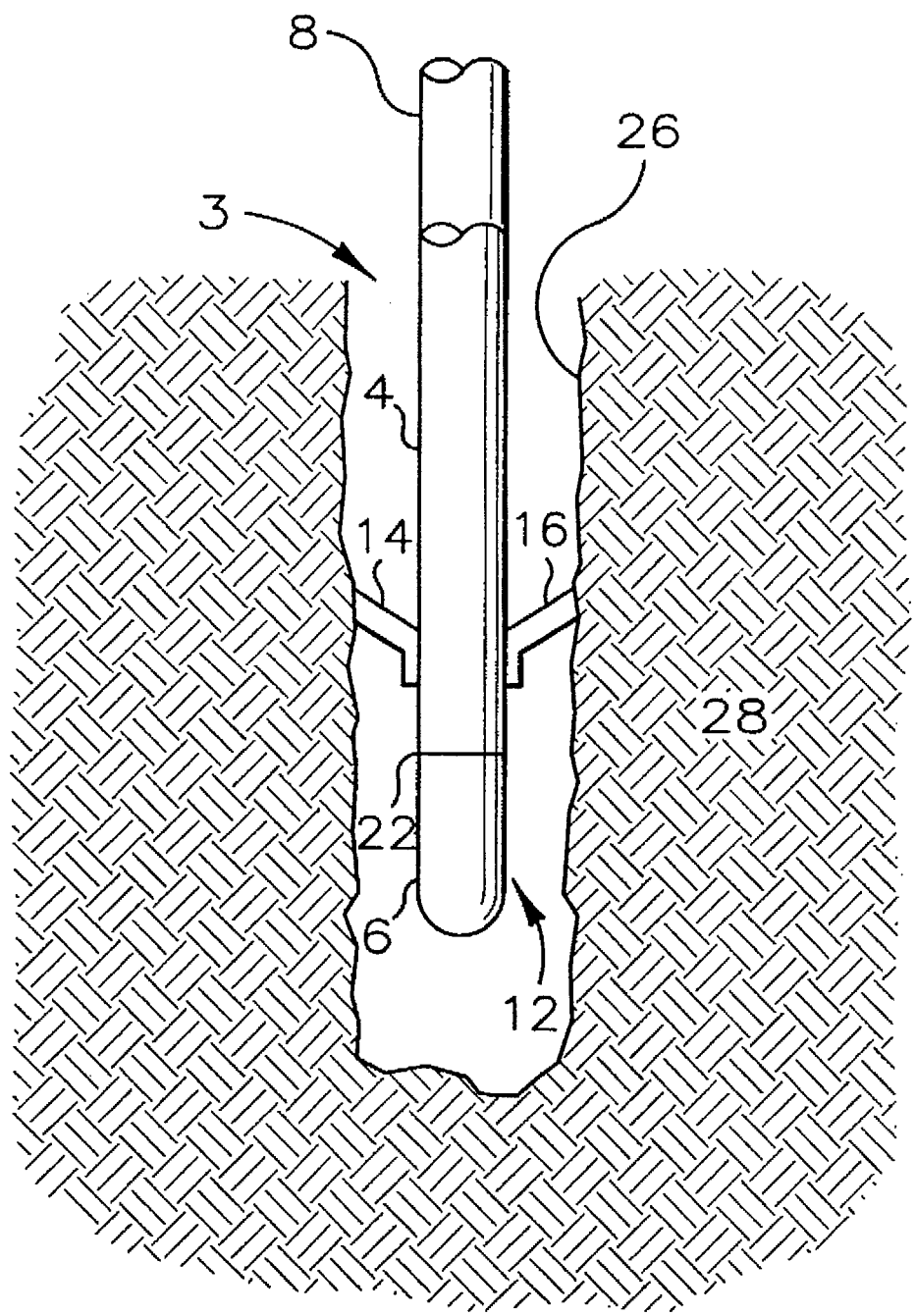
FIG. 6 is an illustration of an alternate embodiment of the invention.

FIG. 6 illustrates a second embodiment of an apparatus according to the invention. In FIG. 6, wing members 14 and 16 are mounted onto underground pipe 4. Wing members 14 and 16 can be mounted onto pipe 4 by any suitable method. Wing members 14 and 16 are positioned so that they flex toward the conduit loop when in-ground conduit system 3 is being lowered down into hole 26 and then contact the ground so as to resist upward movement of the pipe.

Changes may be made in the instruction, combination and arrangement of parts or elements as heretofore set forth in the specification and as shown in the drawings without departing from the spirit and scope of the invention, as defined in the following claims.

That which is claimed:

1. A method of preventing a first pipe and a second pipe from moving upward in a bore-hole comprising;
   (a) connecting the down-hole end of said first pipe and the down-hole end of said second pipe in fluid flow relationship by means of a U-shaped pipe;
   (b) crimping a length of material having a first end portion and a second end portion at a point between said first end portion and said second end portion to form a crimped portion; and attaching said length of material in the area of the vertex of said U-shaped pipe so that said length of material is attached at said crimped portion and so that said first end portion forms a first wing member and said second end portion forms a second wing member such that each said wing member is angled out from said U-shaped member so that when said first pipe and said second pipe are lowered down into said borehole each said wing member will contact the ground so as to allow downward movement and so as to prevent upward movement.

\* \* \* \* \*